United States Patent [19]

Logsdon et al.

[11] Patent Number: 5,026,502
[45] Date of Patent: Jun. 25, 1991

[54] AZEOTROPE-LIKE COMPOSITIONS OF 1,1-DICHORO-1-FLUOROETHANE; DICHLOROTRIFLUOROETHANE; AND ALKANE OR CYCLOALKANE HAVING 5 CARBON ATOMS

[75] Inventors: Peter B. Logsdon, North Tonawanda; Ellen L. Swan, Ransomville; Leonard M. Stachura, Hamburg; Rajat S. Basu, Williamsville, all of N.Y.

[73] Assignee: Allied-Signal Inc., Morristown, N.J.

[21] Appl. No.: 529,086

[22] Filed: May 25, 1990

[51] Int. Cl.$^5$ .......................... C11D 7/30; C11D 7/50; C23G 5/028; B08B 3/00
[52] U.S. Cl. ...................... 252/172; 134/12; 134/38; 134/39; 134/40; 252/162; 252/364; 252/DIG. 9
[58] Field of Search ............... 252/162, 170, 171, 172, 252/DIG. 9, 364; 134/12, 38, 39, 40

[56] References Cited

U.S. PATENT DOCUMENTS

| | | | |
|---|---|---|---|
| 4,531,950 | 7/1985 | Burt et al. | 55/23 |
| 4,531,951 | 7/1985 | Burt et al. | 55/23 |
| 4,836,947 | 6/1989 | Lund et al. | 252/171 |
| 4,842,764 | 6/1989 | Lund et al. | 252/171 |
| 4,863,630 | 9/1989 | Swan et al. | 252/171 |
| 4,894,176 | 1/1990 | Swan et al. | 252/171 |
| 4,954,290 | 9/1990 | Bartlett et al. | 252/305 |
| 4,960,535 | 10/1990 | Logsdon et al. | 252/171 |

FOREIGN PATENT DOCUMENTS

| | | |
|---|---|---|
| 1-03686 | 4/1989 | Japan . |
| 1-36981 | 5/1989 | Japan . |
| 1-36982 | 5/1989 | Japan . |
| 1-37253 | 5/1989 | Japan . |
| 1-37259 | 5/1989 | Japan . |
| 1-38300 | 5/1989 | Japan . |
| 1-39104 | 5/1989 | Japan . |
| 1-39861 | 6/1989 | Japan . |

Primary Examiner—Paul Lieberman
Assistant Examiner—Linda D. Skaling
Attorney, Agent, or Firm—Melanie L. Brown; Jay P. Friedenson

[57] ABSTRACT

Azeotrope-like compositions comprising 1,1-dichloro-1-fluoroethane; dichlorotrifluoroethane; and alkane or cycloalkane having 5 carbon atoms are stable and have utility as degreasing agents and as solvents in a variety of industrial cleaning applications including cold cleaning and defluxing of printed circuit boards and dry cleaning and as blowing agents.

19 Claims, No Drawings 5,026,502

AZEOTROPE-LIKE COMPOSITIONS OF 1,1-DICHORO-1-FLUOROETHANE; DICHLOROTRIFLUOROETHANE; AND ALKANE OR CYCLOALKANE HAVING 5 CARBON ATOMS

FIELD OF THE INVENTION

This invention relates to azeotrope-like mixtures of 1,1-dichloro-1-fluoroethane; dichlorotrifluoroethane; and alkane or cycloalkane having 5 carbon atoms. These mixtures are useful in a variety of vapor degreasing, cold cleaning and solvent cleaning applications including defluxing.

CROSS-REFERENCE TO RELATED APPLICATIONS

Co-pending, commonly assigned U.S. Pat. application Ser. No 345,732, filed May 1, 1989, discloses azeotrope-like mixtures of 1,1-dichloro-1-fluoroethane; dichlorotrifluoroethane; nitromethane; and methanol or ethanol.

Co-pending, commonly assigned U.S. Pat. application Ser. No. 412,080, filed Sept. 25, 1989, discloses azeotrope-like compositions of 1,1-dichloro-1-fluoroethane; dichlorotrifluoroethane; methanol; and cyclopentane.

Co-pending, commonly assigned U.S. Pat. application Ser. No. 417,134, filed Oct. 4, 1989, now U.S. Pat. No. 4,965,011 discloses azeotrope-like mixtures of 1,1-dichloro-1-fluoroethane; dichlorotrifluoroethane; and nitromethane.

Co-pending, commonly assigned U.S. Pat. application Ser. No. 423,993, filed Oct. 19, 1989, discloses azeotrope-like compositions of dichlorotrifluoroethane and methanol.

Co-pending, commonly assigned U.S. Pat. application Ser. No. 435,842, filed Nov. 10, 1989, now U.S. Pat. No. 4,960,535 discloses azeotrope-like compositions of 1,1-dichloro-1-fluoroethane; dichlorotrifluoroethane; and a mono- or di-chlorinated $C_2$ or $C_3$ alkane.

Co-pending, commonly assigned U.S. Pat. application Ser. No. 435,923, filed Nov. 10, 1989, discloses azeotrope-like compositions of 1,1-dichloro-1-fluoroethane; dichlorotrifluoroethane; methanol; and a mono- or di-chlorinated $C_2$ or $C_3$ alkane.

Co-pending, commonly assigned U.S. Pat. application Ser. No. 453,449, filed Dec. 20, 1989, discloses azeotrope-like compositions of 1,1-dichloro-1-fluoroethane; dichlorotrifluoroethane; and methyl formate.

Co-pending, commonly assigned U.S. Pat. application Ser. No. 455,709, filed Dec. 22, 1989, discloses azeotrope-like compositions of 1,1-dichloro-1-fluoroethane; dichlorotrifluoroethane; and dichloromethane.

Co-pending, commonly assigned U.S. Pat. application Ser. No. 505,285, filed Apr. 5, 1990, discloses azeotrope-like compositions of 1,1-dichloro-1-fluoroethane; dichlorotrifluoroethane; and alkene having 5 carbon atoms.

BACKGROUND OF THE INVENTION

Vapor degreasing and solvent cleaning with fluorocarbon based solvents have found widespread use in industry for the degreasing and otherwise cleaning of solid surfaces, especially intricate parts and difficult to remove soils.

In its simplest form, vapor degreasing or solvent cleaning consists of exposing a room temperature object to be cleaned to the vapors of a boiling solvent. Vapors condensing on the object provide clean distilled solvent to wash away grease or other contamination. Final evaporation of solvent from the object leaves behind no residue as would be the case where the object is simply washed in liquid solvent.

For difficult to remove soils where elevated temperature is necessary to improve the cleaning action of the solvent, or for large volume assembly line operations where the cleaning of metal parts and assemblies must be done efficiently and quickly, the conventional operation of a vapor degreaser consists of immersing the part to be cleaned in a sump of boiling solvent which removes the bulk of the soil, thereafter immersing the part in a sump containing freshly distilled solvent near room temperature, and finally exposing the part to solvent vapors over the boiling sump which condense on the cleaned part. In addition, the part can also be sprayed with distilled solvent before final rinsing.

Vapor degreasers suitable in the above-described operations are well known in the art. For example, Sherliker et al. in U.S. Pat. No. 3,085,918 disclose such suitable vapor degreasers comprising a boiling sump, a clean sump, a water separator, and other ancillary equipment.

Cold cleaning is another application where a number of solvents are used. In most cold cleaning applications, the soiled part is either immersed in the fluid or wiped with rags or similar objects soaked in solvents and allowed to air dry.

Fluorocarbon solvents, such as trichlorotrifluoroethane, have attained widespread use in recent years as effective, nontoxic, and nonflammable agents useful in degreasing applications and other solvent cleaning applications. Trichlorotrifluoroethane has been found to have satisfactory solvent power for greases, oils, waxes and the like. It has therefore found widespread use for cleaning electric motors, compressors, heavy metal parts, delicate precision metal parts, printed circuit boards, gyroscopes, guidance systems, aerospace and missile hardware, aluminum parts and the like.

The art has looked towards azeotrope or azeotrope-like compositions including the desired fluorocarbon components such as trichlorotrifluoroethane which include components which contribute additionally desired characteristics, such as polar functionality, increased solvency power, and stabilizers. Azeotropic or azeotrope-like compositions are desired because they do not fractionate upon boiling. This behavior is desirable because in the previously described vapor degreasing equipment with which these solvents are employed, redistilled material is generated for final rinse-cleaning. Thus, the vapor degreasing system acts as a still. Unless the solvent composition exhibits a constant boiling point, i.e., is azeotrope-like, fractionation will occur and undesirable solvent distribution may act to upset the cleaning and safety of processing. Preferential evaporation of the more volatile components of the solvent mixtures, which would be the case if they were not azeotrope-like, would result in mixtures with changed compositions which may have less desirable properties, such as lower solvency towards soils, less inertness towards metal, plastic or elastomer components, and increased flammability and toxicity.

The art is continually seeking new fluorocarbon based azeotrope-like mixtures which offer alternatives for new and special applications for vapor degreasing and other cleaning applications. Currently, of particular interest, are fluorocarbon based azeotrope-like mixtures which are considered to be stratospherically safe substitutes for presently used fully halogenated chlorofluorocarbons. The latter are suspected of causing environmental problems in connection with the earth's protective ozone layer. Mathematical models have substantiated that hydrochlorofluorocarbons, such as 1,1-dichloro-1-fluoroethane (HCFC-141b) and dichlorotrifluoroethane (HCFC-123 or HCFC-123a), will not adversely affect atmospheric chemistry, being negligible contributors to ozone depletion and to green-house global warming in comparison to the fully halogenated species. Both HCFC-141b and dichlorotrifluoroethane are known to be useful as solvents. HCFC-141b has a boiling point of about 32° C. HCFC-123 has a boiling point of about 27.8° C. while HCFC-123a has a boiling point of about 29.9° C.

The use of the aerosol packaging concept has long been found to be a convenient and cost effective means of dispensing solvents. Aerosol products utilize a propellant gas or mixture of propellant gases, preferably in a liquified gas rather than a compressed gas state, to generate sufficient pressure to expel the active ingredients, i.e. product concentrates such as solvents, from the container upon opening of the aerosol valve. The propellants may be in direct contact with the solvent, as in most conventional aerosol systems, or may be isolated from the solvent, as in barrier-type aerosol systems.

The art is also seeking new fluorocarbon azeotrope-like mixtures which are useful as blowing agents. Fluorocarbons such as trichlorofluoromethane have been used commercially as auxiliary blowing agents for flexible foams and as primary blowing agents for rigid foams. Polyurethane foams are manufactured by reacting and foaming a mixture of ingredients comprising in general an organic isocyanate, such as pure or crude toluene diisocyanate or a polymeric diisocyanate, with an appropriate amount of polyol or mixture of polyols, in the presence of a volatile liquid blowing agent, which vaporizes during the reaction, causing the polymerizing mixture to foam. The reactivity of these ingredients is enhanced through the use of various additives such as amine and/or tin catalysts and surfactant materials which serve to control and adjust cell size as well as to stabilize the foam structure during its formation.

Flexible polyurethane foams are generally manufactured using an excess of diisocyanate which reacts with the water also included as a raw material, producing gaseous carbon dioxide, causing foam expansion. Flexible foams are widely used as cushioning materials in items such as furniture, bedding and automobiles. Auxiliary physical blowing agents such as methylene chloride and/or CFC-11 are required in addition to the water/diisocyanate blowing mechanism in order to produce low density, soft grades of flexible polyurethane foam.

Rigid polyurethane foams are almost exclusively expanded using CFC-11 as the blowing agent. Some rigid foam formulations do incorporate small amounts of water in addition to the CFC-11, but the CFC-11 is the major blowing agent component. Other formulations sometimes use small amounts of the more volatile dichlorodifluoromethane (CFC-12) in addition to CFC-11 for producing so-called froth-type foams. Rigid foams are closed-cell foams in which the CFC-11 vapor is trapped in the matrix of cells. These foams offer excellent thermal insulation characteristics, due in part to the low vapor thermal conductivity of CFC-11, and are used widely in thermal insulation applications such as roofing systems, building panels, refrigerators and freezers and the like.

Commonly assigned U.S. Pat. No. 4,836,947 discloses azeotrope-like mixtures of 1,1-dichloro-1-fluoroethane and ethanol. Commonly assigned U.S. Pat. NO. 4,842,764 discloses azeotrope-like mixtures of 1,1-dichloro-1-fluoroethane and methanol. Commonly assigned U.S. Pat. No. 4,863,630 discloses azeotrope-like mixtures of 1,1-dichloro-1-fluoroethane; dichlorotrifluoroethane; and ethanol. Commonly assigned U.S. Pat. No. 4,894,176 discloses azeotrope-like mixtures of 1,1-dichloro-1-fluoroethane; dichlorotrifluoroethane; and methanol.

Kokai Patent Publication 103,686, published Apr. 20, 1989, discloses an azeotropic mixture of 55 to 80 weight percent dichlorotrifluoroethane and 20 to 45 weight percent 1,1-dichloro-1-fluoroethane. Kokai Patent Publication 136,981, published May 30, 1989, discloses a degreasing cleaning agent of 25 weight percent n-heptane and 75 weight percent of an azeotropic composition of 25 weight percent 1,1-dichloro-1-fluoroethane and 50 weight percent 1,1-dichloro-2,2,2-trifluoroethane.

Kokai Patent Publication 136,982, published May 30, 1989, discloses a buff-grinding cleaning agent of 25 weight percent n-hexane and 75 weight percent of an azeotropic composition of 25 weight percent 1,1-dichloro-1-fluoroethane and 50 weight percent 1,1-dichloro-2,2,2-trifluoroethane. Kokai Patent Publication 137,253, published May 30, 1989, discloses a resist developing agent of 25 weight percent n-heptane and 75 weight percent of an azeotropic composition of 25 weight percent 1,1-dichloro-1-fluoroethane and 50 weight percent 1,1-dichloro-2,2,2-trifluoroethane.

Kokai Patent Publication 137,259, published May 30, 1989, discloses a resist separating agent of 15 weight percent n-pentane, 10 weight percent alkyl benzene sulfonic acid, and 75 weight percent of an azeotropic composition of 25 weight percent 1,1-dichloro-1-fluoroethane and 50 weight percent 1,1-dichloro-2,2,2-trifluoroethane. Kokai Patent Publication 138,300, published May 31, 1989, discloses a flux cleaning agent of 25 weight percent n-heptane and 75 weight percent of an azeotropic composition of 25 weight percent 1,1-dichloro-1-fluoroethane and 50 weight percent 1,1-dichloro-2,2,2-trifluoroethane.

Kokai Patent Publication 139,104, published May 31, 1989, discloses a solvent of 5 weight percent n-heptane, 20 weight percent methanol, and 75 weight percent of an azeotropic composition of 25 weight percent 1,1-dichloro-1-fluoroethane and 75 weight percent 1,1-dichloro-2,2,2-trifluoroethane. Kokai Patent Publication 139,861, published June 1, 1989, discloses a dry-cleaning agent of 25 weight percent n-heptane and 75 weight percent of an azeotropic composition of 25 weight percent 1,1-dichloro-1-fluoroethane and 75 weight percent 1,1-dichloro-2,2,2-trifluoroethane.

It is an object of this invention to provide novel azeotrope-like compositions based on HCFC-141b and dichlorotrifluoroethane which are liquid at room temperature, which will not fractionate substantially under the process of distillation or evaporation, and which are useful as solvents for use in vapor degreasing and other solvent cleaning applications including defluxing applications and dry cleaning and as blowing agents for the preparation of polyurethane and polyisocyanurate foams.

Another object of the invention is to provide novel environmentally acceptable solvents for use in the aforementioned applications.

A further object of the invention is to provide novel environmentally acceptable blowing agents for the production of rigid and flexible polyurethane and polyisocyanurate foams.

Other objects and advantages of the invention will become apparent from the following description.

DESCRIPTION OF THE INVENTION

In accordance with the invention, novel mixtures have been discovered comprising 1,1-dichloro-1-fluoroethane; dichlorotrifluoroethane; and alkane or cycloalkane having 5 carbon atoms. Also, novel azeotrope-like or constant-boiling compositions have been discovered comprising 1,1-dichloro-1-fluoroethane; dichlorotrifluoroethane; and alkane or cycloalkane having 5 carbon atoms. Preferably, the alkane having 5 carbon atoms is selected from the group consisting of n-pentane; 2-methylbutane; 2,2-dimethylpropane; and cyclopentane. The dichlorotrifluoroethane component can be one of its isomers: 1,1-dichloro-2,2,2-trifluoroethane (HCFC-123); 1,2-dichloro-1,1,2-trifluoroethane (HCFC-123a); or mixtures thereof in any proportions.

The boiling point of n-pentane is about 36° C. while the boiling point of cyclopentane is about 49° C.

The preferred isomer of dichlorotrifluoroethane is HCFC-123. Preferably, "commercial HCFC-123" which is available as "pure" HCFC-123 containing about 90 to about 95 weight percent of HCFC-123, about 5 to about 10 weight percent of HCFC-123a, and impurities such as trichloromonofluoromethane, trichlorotrifluoroethane, and methylene chloride which due to their presence in insignificant amounts, have no deleterious effects on the properties of the azeotrope-like compositions, is used. "Commercial HCFC-123" is also available as "ultra-pure" HCFC-123 which contains about 95 to about 99.5 weight percent of HCFC-123, about 0.5 to about 5 weight percent of HCFC-123a, and impurities as listed above.

Preferably, the novel azeotrope-like compositions comprise effective amounts of 1,1-dichloro-1-fluoroethane; dichlorotrifluoroethane; and n-pentane or cyclopentane. The term "effective amounts" as used herein means the amount of each component which upon combination with the other component, results in the formation of the present azeotrope-like composition.

The 1,1-dichloro-1-fluoroethane component of the invention has good solvent properties. The dichlorotrifluoroethane component of the invention also has good solvent properties. The alkane or cycloalkane component also has good solvent capabilities and enhances the solubility of oils. Thus, when these components are combined in effective amounts, an efficient azeotrope-like solvent results.

Preferably, novel azeotrope-like compositions comprise 1,1-dichloro-1-fluoroethane; dichlorotrifluoroethane selected from the group consisting of 1,1-dichloro-2,2,2-trifluoroethane, 1,2-dichloro-1,1,2-trifluoroethane, and mixtures thereof; and alkane or cycloalkane having 5 carbon atoms selected from the group consisting of n-pentane and cyclopentane which boil at about 31.0° C. ±about 1.1° C. at 760 mm Hg (101 kPa).

When the dichlorotrifluoroethane used is 1,1-dichloro-2,2,2-trifluoroethane, novel azeotrope-like compositions preferably comprise 1,1-dichloro-1-fluoroethane; 1,1-dichloro-2,2,2-trifluoroethane; and n-pentane which boil at about 30.8° C. ±about 0.9° C. at 760 mm Hg (101 kPa).

Novel azeotrope-like compositions also preferably comprise from about 55 to about 94.5 weight percent of 1,1-dichloro-1-fluoroethane; from about 5 to about 44.5 weight percent of 1,1-dichloro-2,2,2-trifluoroethane; and from about 0.5 to about 45 weight percent of n-pentane which boil at about 30.8° C. at 760 mm Hg (101 kPa).

Preferably the azeotrope-like compositions of the invention comprise from about 64.5 to about 89.5 weight percent of 1,1-dichloro-1-fluoroethane; from about 10 to about 35 weight percent of 1,1-dichloro-2,2,2-trifluoroethane; and from about 0.5 to about 25.5 weight percent of n-pentane.

Because the boiling point of 1,1-dichloro-2,2,2-trifluoroethane is 27.8° C. and the boiling point of 1,2-dichloro-1,1,2-trifluoroethane is 29.9° C., it is believed that azeotrope-like compositions of 1,2-dichloro-1,1,2-trifluoroethane; 1,1-dichloro-1-fluoroethane; and n-pentane would form. It should be understood that the aforementioned compositional ranges for azeotrope-like compositions of 1,1-dichloro-1-fluoroethane; 1,1-dichloro-2,2,2-trifluoroethane; and n-pentane also apply to azeotrope-like compositions of 1,1-dichloro-1-fluoroethane; 1,2-dichloro-1,1,2-trifluoroethane; and n-pentane.

Because the boiling point of 1,1-dichloro-2,2,2-trifluoroethane is so close to the boiling point of 1,2-dichloro-1,1,2-trifluoroethane, it is also believed that azeotrope-like compositions of 1,1-dichloro-1-fluoroethane; a mixture of 1,1-dichloro-2,2,2-trifluoroethane and 1,2-dichloro-1,1,2-trifluoroethane; and n-pentane would form. Preferably, the azeotrope-like compositions comprise from about 55 to about 94.5 weight percent of 1,1-dichloro-1-fluoroethane; from about 5 to about 44.5 weight percent of a mixture of 1,1-dichloro-2,2,2-trifluoroethane and 1,2-dichloro-1,1,2-trifluoroethane; and from about 0.5 to about 45 weight percent of n-pentane.

More preferably, the azeotrope-like compositions comprise from about 64.5 to about 89.5 weight percent of 1,1-dichloro-1-fluoroethane; from about 10 to about 35 weight percent of a mixture of 1,1-dichloro-2,2,2-trifluoroethane and 1,2-dichloro-1,1,2-trifluoroethane; and from about 0.5 to about 25.5 weight percent of n-pentane.

Also when the dichlorotrifluoroethane used is 1,1-dichloro-2,2,2-trifluoroethane, novel azeotrope-like compositions preferably comprise 1,1-dichloro-1-fluoroethane; 1,1-dichloro-2,2,2-trifluoroethane; and cyclopentane which boil at about 31.9° C. ±about 0.1° C. at 760 mm Hg (101 kPa).

Novel azeotrope-like compositions also preferably comprise from about 55 to about 94.5 weight percent of 1,1-dichloro-1-fluoroethane; from about 5 to about 44.5 weight percent of 1,1-dichloro-2,2,2-trifluoroethane; and from about 0.5 to about 45 weight percent of cyclopentane which boil at about 31.9° C. at 760 mm Hg (101 kPa).

Preferably the azeotrope-like compositions of the invention comprise from about 64.5 to about 89.5 weight percent of 1,1-dichloro-1-fluoroethane; from about 10 to about 35 weight percent of 1,1-dichloro-2,2,2-trifluoroethane; and from about 0.5 to about 25.5 weight percent of cyclopentane.

Because the boiling point of 1,1-dichloro-2,2,2-trifluoroethane is 27.8° C. and the boiling point of 1,2- dichloro-1,1,2-trifluoroethane is 29.9° C., it is believed that azeotrope-like compositions of 1,2-dichloro-1,1,2-trifluoroethane; 1,1-dichloro-1-fluoroethane; and cyclopentane would form. It should be understood that the aforementioned compositional ranges for azeotrope-like compositions of 1,1-dichloro-1-fluoroethane; 1,1-dichloro-2,2,2-trifluoroethane; and cyclopentane also apply to azeotrope-like compositions of 1,1-dichloro-1-fluoroethane; 1,2-dichloro-1,1,2-trifluoroethane; and cyclopentane.

Because the boiling point of 1,1-dichloro-2,2,2-trifluoroethane is so close to the boiling point of 1,2-dichloro-1,1,2-trifluoroethane, it is also believed that azeotrope-like compositions of 1,1-dichloro-1-fluoroethane; a mixture of 1,1-dichloro-2,2,2-trifluoroethane and 1,2-dichloro-1,1,2-trifluoroethane; and cyclopentane would form. Preferably, the azeotrope-like compositions comprise from about 55 to about 94.5 weight percent of 1,1-dichloro-1-fluoroethane; from about 5 to about 44.5 weight percent of a mixture of 1,1-dichloro-2,2,2-trifluoroethane and 1,2-dichloro-1,1,2-trifluoroethane; and from about 0.5 to about 45 weight percent of cyclopentane.

More preferably, the azeotrope-like compositions comprise from about 64.5 to about 89.5 weight percent of 1,1-dichloro-1-fluoroethane; from about 10 to about 35 weight percent of a mixture of 1,1-dichloro-2,2,2-trifluoroethane and 1,2-dichloro-1,1,2-trifluoroethane; and from about 0.5 to about 25.5 weight percent of cyclopentane.

As previously noted, the preferred dichlorotrifluoroethane component is "commercial HCFC-123".

The azeotrope-like compositions of the invention containing a mixture of HCFC-123 and HCFC-123a are azeotrope-like in that they are constant-boiling or essentially constant-boiling. It is not known whether this is the case because the separate ternary azeotrope-like compositions with HCFC-123 and HCFC-123a have boiling points so close to one another as to be indistinguishable for practical purposes or whether HCFC-123 and HCFC-123a form a quaternary azeotrope with 1,1-dichloro-1-fluoroethane and n-pentane or cyclopentane.

All compositions within the indicated ranges, as well as certain compositions outside the indicated ranges, are azeotrope-like, as defined more particularly below.

The precise azeotrope compositions have not been determined but have been ascertained to be within the above ranges. Regardless of where the true azeotropes lie, all compositions with the indicated ranges, as well as certain compositions outside the indicated ranges, are azeotrope-like, as defined more particularly below.

It has been found that these azeotrope-like compositions are on the whole nonflammable liquids, i.e. exhibit no flash point when tested by the Tag Open Cup test method—ASTM D 1310-86.

From fundamental principles, the thermodynamic state of a fluid is defined by four variables: pressure, temperature, liquid composition and vapor composition, or P-T-X-Y, respectively An azeotrope is a unique characteristic of a system of two or more components where X and Y are equal at the stated P and T. In practice, this means that the components of a mixture cannot be separated during distillation, and therefore are useful in vapor phase solvent cleaning as described above.

For the purpose of this discussion, azeotrope-like composition is intended to mean that the composition behaves like an azeotrope, i.e. has constant-boiling characteristics or a tendency not to fractionate upon boiling or evaporation. Thus, in such compositions, the composition of the vapor formed during boiling or evaporation is identical or substantially identical to the original liquid composition. Hence, during boiling or evaporation, the liquid composition, if it changes at all, changes only to a minimal or negligible extent. This is to be contrasted with non-azeotrope-like compositions in which during boiling or evaporation, the liquid composition changes to a substantial degree.

Thus, one way to determine whether a candidate mixture is "azeotrope-like" within the meaning of this invention, is to distill a sample thereof under conditions (i.e. resolution—number of plates) which would be expected to separate the mixture into its separate components. If the mixture is non-azeotrope-like, the mixture will fractionate, i.e. separate into its various components with the lowest boiling component distilling off first, and so on. If the mixture is azeotrope-like, some finite amount of a first distillation cut will be obtained which contains all of the mixture components and which is constant-boiling or behaves as a single substance. This phenomenon cannot occur if the mixture is not azeotrope-like, i.e. it does not behave like an azeotrope. Of course, upon distillation of an azeotrope-like composition such as in a vapor degreaser, the true azeotrope will form and tend to concentrate.

It follows from the above that another characteristic of azeotrope-like compositions is that there is a range of compositions containing the same components in varying proportions which are azeotrope-like or constant-boiling. All such compositions are intended to be covered by the term azeotrope-like or constant-boiling as used herein. As an example, it is well known that at differing pressures, the composition of a given azeotrope-like composition will vary at least slightly as does the boiling point of the composition. Thus, an azeotrope-like composition of A and B represents a unique type of relationship but with a variable composition depending on temperature and/or pressure. With 1,1-dichloro-1-fluoroethane; 1,1-dichloro-2,2,2-trifluoroethane; and n-pentane, the mixtures boil within ±about 0.9° C. (at about 760 mm Hg (101 kPa)) of the 30.8° C. boiling point. With 1,1-dichloro-1-fluoroethane; 1,1-dichloro-2,2,2-trifluoroethane; and cyclopentane, the mixtures boil within ±about 0.1° C. (at about 760 mm Hg (101 KPa)) of the 31.9° C. boiling point. As is readily understood by persons skilled in the art, the boiling point of the azeotrope-like composition will vary with the pressure.

The azeotrope-like compositions of the invention are useful as solvents in a variety of vapor degreasing, cold cleaning and solvent cleaning applications including defluxing.

In one process embodiment of the invention, the azeotrope-like compositions of the invention may be used to clean solid surfaces by treating said surfaces with said compositions in any manner well known to the art such as by dipping or spraying or use of conventional degreasing apparatus.

When the present azeotrope-like compositions are used to clean solid surfaces by spraying the surfaces with the compositions, preferably, the azeotrope-like compositions are sprayed onto the surfaces by using a propellant. Preferably, the propellant is selected from the group consisting of hydrocarbons, chlorofluorocarbons, hydrochlorofluorocarbon, hydrofluorocarbon, dimethyl ether, carbon dioxide, nitrogen, nitrous oxide, methylene oxide, air, and mixtures thereof.

Useful hydrocarbon propellants include isobutane, butane, propane, and mixtures thereof; commercially available isobutane, butane, and propane may be used in the present invention. Useful chlorofluorocarbon propellants include trichlorofluoromethane (known in the art as CFC-11), dichlorodifluoromethane (known in the art as CFC-12), 1,1,2-trichloro-1,2,2-trifluoroethane (known in the art as CFC-113), and 1,2-dichloro-1,1,2,2-tetrafluoroethane (known in the art as CFC-114); commercially available CFC-11, CFC-12, CFC-113, and CFC-114 may be used in the present invention.

Useful hydrochlorofluorocarbon propellants include dichlorofluoromethane (known in the art as HCFC-21), chlorodifluoromethane (known in the art as HCFC-22), 1-chloro-1,2,2,2-tetrafluoroethane (known in the art as HCFC-124), 1,1-dichloro-2,2-difluoroethane (known in the art as HCFC-132a), 1-chloro-2,2,2-trifluoroethane (known in the art as HCFC-133), and 1-chloro-1,1-difluoroethane known in the art as HCFC-142b); commercially available HCFC-21, HCFC-22, and HCFC-142b may be used in the present invention. HCFC-124 may be prepared by a known process such as that taught by U.S. Pat. No. 4,843,181 and HCFC-133 may be prepared by a known process such as that taught by U.S. Pat. No. 3,003,003.

Useful hydrofluorocarbon propellants include trifluoromethane (known in the art as HFC-23), 1,1,1,2-tetrafluoroethane (known in the art as HFC-134a), and 1,1-difluoroethane (known in the art as HFC-152a); commercially available HFC-23 and HFC-152a may be used in the present invention. Until HFC-134a becomes available in commercial quantities, HFC-134a may be made by a known method such as that disclosed by U.S. Pat. No. 4,851,595. More preferred propellants include hydrochlorofluorocarbons, hydrofluorocarbons, and mixtures thereof. The most preferred propellants include chlorodifluoromethane and 1,1,1,2-tetrafluoroethane.

In another process embodiment of the invention, the azeotrope-like compositions of the invention may be used to form polyurethane and polyisocyanurate foams by reacting and foaming a mixture of ingredients which will react to form polyurethane and polyisocyanurate foams in the presence of a blowing agent comprising the azeotrope-like compositions.

The compositions of the invention may be used as auxiliary or primary blowing agents for the preparation of polyurethane foams. Polyurethanes are polymers of polyols and isocyanates. A wide variety of polyols may be employed as disclosed in the prior art, such as polyether polyols and polyester polyols. Illustrative suitable polyether Polyols are polyoxypropylene diols having a molecular weight of between about 1,500 and 2,500, glycerol based polyoxypropylene triols having a molecular weight of between about 1,000 and 3,000, trimethylol-propane-based triols having a hydroxyl number of about 390, sorbitol-based hexol having a hydroxyl number of about 490, and sucrose-based octols having a hydroxyl number of about 410. Illustrative suitable polyester polyols are the reaction products of polyfunctional organic carboxylic acids such as succinic acid, adipic acid, phthalic acid and terephthalic acid with monomeric polyhydric alcohols such as glycerol, ethylene glycol, trimethylol propane, and the like.

A wide variety of isocyanates may be employed as disclosed in the prior art. Illustrative suitable isocyanates are the aliphatic isocyanates such as hexamethylene diisocyanate, aromatic isocyanates such as toluene diisocyanate (TDI), preferably the isomeric mixture containing about 80 weight percent of the 2,4 isomer and 20 weight percent of the 2,6 isomer, crude TDI, crude diphenylmethane diisocyanate and polymethylpolyphenyl isocyanate.

The amount of blowing agent to be employed will depend on whether it is to be used as a primary or auxiliary blowing agent and the nature of the foams desired, i.e, whether flexible or rigid foam is desired.

The amount of blowing agent employed can be readily determined by persons of ordinary skill in the art. Generally, about 1 to about 15 weight percent based on the polyurethane forming reaction mixture is employed and preferably, between about 5 to about 10 weight percent.

As is well known in the art, the urethane-forming reaction requires a catalyst. Any of the well known urethane-forming catalysts may be employed. Illustrative organic catalysts are the amino compounds such as triethylenediamine N,N,N',N'-tetramethylethylenediamine, dimethylethanolamine, triethylamine and N-ethylmorpholine. Inorganic compounds such as the non-basic heavy metal compounds as illustrated by dibutyl tin dilaurate, stannous octoate and manganese acetyl acetonate may also be used as catalysts. In general, the amount of catalyst present in the foam forming mixture ranges from about 0.05 to about 2 parts by weight per 100 parts by weight of the polyol component.

As is well recognized in the art, a variety of other additives may be incorporated in the foam-forming mixtures including stabilizers, such as silicone oils; cross-linking agents such as 1,4-butanediol, glycerol, triethanolamine methylenedianiline; plasticizers, such as tricresyl phosphate and dioctyl phthalate; antioxidants; flame retardants; coloring material; fillers; and antiscorch agents.

Polyurethane foams are prepared according to the invention by reacting and foaming a mixture of ingredients which will react to form the foams in the presence of a blowing agent according to the invention. In practice, the foam forming ingredients are blended, allowed to foam, and are then cured to a finished product. The foaming and curing reactions, and conditions therefor are well-known in the art and do not form a part of this invention. Such are more fully described in the prior art relating to the manufacture of polyurethane foams. Thus, for example, the polyether may first be converted to a polyether-polyisocyanate prepolymer by reaction in one or more stages with an excess amount of isocyanate at temperatures from about 75°–125° C. or by reacting the polyol and the isocyanate together at room temperature in the presence of a catalyst for the reaction such as N-methylmorpholine. The prepolymer would then be charged to the foam-forming mixture as the foam producing ingredient with or without the addition of additional isocyanate and foamed in the presence of the blowing agent, optionally with additional polyol cross-linking agents and other conventional optional additives. Heat may be applied to cure the foam. If a prepolymer is not employed, the polyether, isocyanate, blowing agent and other optional additives may be reacted simultaneously to produce the foam in a single stage.

The 1,1-dichloro-1-fluoroethane; dichlorotrifluoroethane; n-pentane; and cyclopentane components of the novel solvent azeotrope-like compositions of the invention are known materials. Preferably, except for "commercial HCFC-123" and its impurities, the materials should be used in sufficiently high purity so as to avoid the introduction of adverse influences upon the desired properties or constant-boiling properties of the system.

It should be understood that the present compositions may include additional components so as to form new azeotrope-like or constant-boiling compositions. Any such compositions are considered to be within the scope of the present invention as long as the compositions are constant-boiling or essentially constant-boiling and contain all of the essential components described herein.

The present invention is more fully illustrated by the following non-limiting Examples.

EXAMPLES 1-4

These examples confirm the existence of constant-boiling or azeotrope-like compositions of 1,1-dichloro-1-fluoroethane; 1,1-dichloro-2,2,2-trifluoroethane; and n-pentane via the method of distillation. It also illustrates that these mixtures do not fractionate during distillation.

A 5-plate Oldershaw distillation column with a cold water condensed automatic liquid dividing head was used for these examples. For each Example, the distillation column was charged with HCFC-141b, commercially available ultra-pure HCFC-123, n-pentane, and nitromethane in the amounts indicated in Table I below for the starting material. Each composition was heated under total reflux for about an hour to ensure equilibration. A reflux ratio of 3:1 was employed for this particular distillation. Approximately 50 percent of the original charges were collected in four similar-sized overhead fractions. The compositions of these fractions were analyzed using gas chromatography. The averages of the distillate fractions and the overhead temperatures are quite constant within the uncertainty associated with determining the compositions, indicating that the mixtures are constant-boiling or azeotrope-like.

EXAMPLES 5-8

Examples 1 through 4 are repeated except that 1,2-dichloro-1,1,2-trifluoroethane is used instead of 1,1-dichloro-2,2,2-trifluoroethane.

EXAMPLES 9-12

Examples 1 through 4 are repeated except that a mixture of 1,1-dichloro-2,2,2-trifluoroethane and 1,2-dichloro-1,1,2-trifluoroethane is used instead of 1,1-dichloro-2,2,2-trifluoroethane.

EXAMPLES 13-16

These examples confirm the existence of constant-boiling or azeotrope-like compositions of 1,1-dichloro-1-fluoroethane; 1,1-dichloro-2,2,2-trifluoroethane; and cyclopentane via the method of distillation. It also illustrates that these mixtures do not fractionate during distillation.

A 5-plate Oldershaw distillation column with a cold water condensed automatic liquid dividing head was used for these examples. For each Example, the distillation column was charged with HCFC-141b, commercially available ultra-pure HCFC-123, and cyclopentane in the amounts indicated in Table II below for the starting material. Each composition was heated under total reflux for about an hour to ensure equilibration. A reflux ratio of 2:1 was employed for this particular distillation. Approximately 50 percent of the original charges were collected in four similar-sized overhead fractions. The compositions of these fractions were analyzed using gas chromatography. The averages of the distillate fractions and the overhead temperatures are quite constant within the uncertainty associated with determining the compositions, indicating that the mixtures are constant-boiling or azeotrope-like.

TABLE I

| Example | HCFC-141b | HCFC-123 | N-PENTANE | NITROMETHANE |
|---|---|---|---|---|
| Starting Material (wt. %) | | | | |
| 1 | 85.0 | 12.7 | 2.0 | 0.36 |
| 2 | 72.5 | 25.1 | 2.0 | 0.30 |
| 3 | 80.0 | 10.0 | 10.0 | — |
| 4 | 64.9 | 25.0 | 10.1 | — |
| Distillate Compositions (wt. %) | | | | |
| 1 | 83.0 | 14.1 | 2.9 | — |
| 2 | 69.3 | 27.5 | 3.2 | — |
| 3 | 74.0 | 12.3 | 13.7 | — |
| 4 | 55.0 | 30.8 | 14.2 | — |

| Example | Boiling Point (°C.) | Barometric Pressure (mmHg) (kPa) | Boiling Point Corrected to 760 mmHg (101 kPa) |
|---|---|---|---|
| 1 | 31.3 | 749.1(100) | 31.7 |
| 2 | 30.3 | 749.1(100) | 30.7 |
| 3 | 30.1 | 758.8(101) | 30.1 |
| 4 | 29.9 | 758.8(101) | 29.9 |
| | | | Mean 30.8 ± 0.9 |

From the above examples, it is readily apparent that additional constant-boiling or essentially constant-boiling mixtures of the same components can readily be identified by anyone of ordinary skill in this art by the method described. No attempt was made to fully characterize and define the outer limits of the composition ranges which are constant-boiling. Anyone skilled in the art can readily ascertain other constant-boiling or essentially constant-boiling mixtures containing the same components.

TABLE II

| Example | HCFC-141b | HCFC-123 | CYCLOPENTANE |
|---|---|---|---|
| Starting Material (wt. %) | | | |
| 13 | 68.5 | 30.3 | 1.2 |
| 14 | 88.1 | 10.0 | 2.0 |
| 15 | 89.3 | 10.2 | 0.5 |
| 16 | 93.0 | 5.0 | 2.0 |
| Distillate Compositions (wt. %) | | | |
| 13 | 65.3 | 33.8 | 0.9 |
| 14 | 86.9 | 11.7 | 1.4 |

TABLE II-continued

| | Boiling Point (°C.) | Barometric Pressure (mmHg) (kPa) | Boiling Point Corrected to 760 mmHg (101 kPa) |
|---|---|---|---|
| 15 | 87.0 | 12.6 | 0.4 |
| 16 | 93.0 | 5.7 | 1.3 |

| Example | Boiling Point (°C.) | Barometric Pressure (mmHg) (kPa) | Boiling Point Corrected to 760 mmHg (101 kPa) |
|---|---|---|---|
| 13 | 30.8 | 744.7(99) | 31.9 |
| 14 | 31.2 | 741.7(99) | 31.9 |
| 15 | 31.3 | 741.9(99) | 32.0 |
| 16 | 31.1 | 741.7(99) | 31.8 |
| | | | Mean 31.9 ± 0.1 |

From the above examples, it is readily apparent that additional constant-boiling or essentially constant-boiling mixtures of the same components can readily be identified by anyone of ordinary skill in this art by the method described. No attempt was made to fully characterize and define the outer limits of the composition ranges which are constant-boiling. Anyone skilled in the art can readily ascertain other constant-boiling or essentially constant-boiling mixtures containing the same components.

EXAMPLES 17-20

Examples 13 through 16 are repeated except that 1,2-dichloro-1,1,2-trifluoroethane is used instead of 1,1-dichloro-2,2,2-trifluoroethane.

EXAMPLES 21-24

Examples 13 through 16 are repeated except that a mixture of 1,1-dichloro-,2,2,2-trifluoroethane and 1,2-dichloro-1,1,2-trifluoroethane is used instead of 1,1-dichloro-2,2,2-trifluoroethane.

EXAMPLES 25-48

Performance studies are conducted wherein metal coupons are cleaned using the present azeotrope-like compositions as solvents. The metal coupons are soiled with various types of oils and heated to 93° C. so as to partially simulate the temperature attained while machining and grinding in the presence of these oils.

The metal coupons thus treated are degreased in a three-sump vapor phase degreaser machine. In this typical three-sump degreaser, condenser coils around the lip of the machine are used to condense the solvent vapor which is then collected in a sump. The condensate overflows into cascading sumps and eventually goes into the boiling sump.

The metal coupons are held in the solvent vapor and then vapor rinsed for a period of 15 seconds to 2 minutes depending upon the oils selected. The azeotrope-like compositions of Examples 1 through 24 are used as the solvents. Cleanliness testing of coupons are done by measurement of the weight change of the coupons using an analytical balance to determine the total residual materials left after cleaning.

EXAMPLES 49-72

For the following examples, six-ounce three-piece aerosol cans are used. The azeotrope-like composition of each of Examples 1-24 is weighed into a tared aerosol can. After purging the can with tetrafluoroethane in order to displace the air within the container, a valve is mechanically crimped onto the can. Liquid chlorodifluoromethane is then added through the valve utilizing pressure burettes.

A printed circuit board having an area of 37.95 square inches and densely populated with dip sockets, resistors, and capacitors is precleaned by rinsing with isopropanol before wave soldering. The board is then fluxed and wave soldered using a Hollis TDL wave solder machine.

The printed circuit board is then spray cleaned using the aerosol can having the azeotrope-like composition therein. The cleanliness of the board is tested visually and also using an Omega-meter which measured the ionic contamination of the board.

EXAMPLES 73-96

Free-rise rigid polyurethane foam is prepared from the formulation specified in Table III using a Martin Sweets Co. Modern Module III urethane foam machine at a delivery rate of 15 lbs./min by using the azeotrope-like compositions of Examples 1 through 24 as blowing agents. This polyurethane formulation is one example of a pour-in-place rigid polyurethane formulation which might be used as an appliance insulation.

TABLE III

| Rigid Polyurethane Formulation | |
|---|---|
| Component | Parts by Weight |
| Pluracol 1114[1] (420-OH#) | 100. |
| Silicone L-5340[2] | 1.5 |
| Thancat TD-33[3] | 0.5 |
| Thancat DME[4] | 0.2 |
| Catalyst T-12[5] | 0.1 |
| HCFC-123/HCFC-141b(33/67) | 33.24 |
| Lupranate M20S[6] (1.29 Index) | 129. |

[1]BASF Wyandotte Corp. - polyether polyol
[2]Union Carbide Corp. - silicone surfactant
[3]Texaco Inc. - 33 triethylene diamine in propylene glycol
[4]Texaco Inc. - N,N-dimethylethanolamine
[5]Metal & Thermit Co. - dibutyl dilaurate
[6]BASF Wyandotte Corp. - polymethylene polyphenylisocyanate Inhibitors may be added to the present azeotrope-like compositions to inhibit decomposition of the compositions; react with undesirable decomposition products of the compositions; and/or prevent corrosion of metal surfaces. Any or all of the following classes of inhibitors may be employed in the invention: epoxy compounds such as propylene oxide; nitroalkanes such as nitromethane; ethers such as 1-4-dioxane; unsaturated compounds such as 1,4-butyne diol; acetals or ketals such as dipropoxy methane; ketones such as methyl ethyl ketone; alcohols such as tertiary amyl alcohol; esters such as triphenyl phosphite; and amines such as triethyl amine. Other suitable inhibitors will readily occur to those skilled in the art.

Having described the invention in detail and by reference to preferred embodiments thereof, it will be apparent that modifications and variations are possible without departing from the scope of the invention defined in the appended claims.

What is claimed is:

1. Azeotrope-like compositions consisting essentially of from about 55 to about 94.5 weight percent 1,1-dichloro-1-fluoroethane, from about 5 to about 44.5 weight percent dichlorotrifluoroethane selected from the group consisting of 1,1-dichloro-2,2,2-trifluoroethane, 1,2-dichloro-1,1,2-trifluoroethane, and mixtures thereof, and from about 0.5 to about 45 weight percent alkane or cycloalkane having 5 carbon atoms selected from the group consisting of n-pentane and cyclopentane wherein said azeotrope-like components consist of said 1,1-dichloro-1-fluoroethane, said dichlorotrifluoroethane, and said n-pentane or cyclopentane and said azeotrope-like compositions boil at about 31.0° C.±1.1° C. at 760 mm Hg.

2. The azeotrope-like compositions of claim 1 wherein said dichlorotrifluoroethane is 1,1-dichloro-2,2,2-trifluoroethane, said alkane is n-pentane, and said azeotrope-like compositions boil at about 30.8° C. at 760 mm Hg.

3. Azeotrope-like compositions consisting essentially of from about 55 to about 94.5 weight percent, 1,1-dichloro-1-fluoroethane, from about 5 to about 44.5 weight percent 1,1-dichloro-2,2,2-trifluoroethane, and from about 0.5 to about 45 weight percent n-pentane wherein said azeotrope-like components consist of said 1,1-dichloro-1-fluoroethane, said 1,1-dichloro-2,2,2-trifluoroethane, and said n-pentane and said azeotrope-like compositions boil at about 30.8° C. at 760 mm Hg.

4. The azeotrope-like compositions of claim 3 comprising from about 64.5 to about 89.5 weight percent said 1,1-dichloro-1-fluoroethane, from about 10 to about 35 weight percent said 1,1-dichloro-2,2,2-trifluoroethane, and from about 0.5 to about 25.5 weight percent said n-pentane.

5. Azeotrope-like compositions consisting essentially of from about 55 to about 94.5 weight percent 1,1-dichloro-1-fluoroethane, from about 5 to about 44.5 weight percent 1,2-dichloro-1,1,2-trifluoroethane, and from about 0.5 to about 45 weight percent n-pentane wherein said azeotrope-like components consist of said 1,1-dichloro-1-fluoroethane, said 1,2-dichloro-1,1,2-trifluoroethane, and said n-pentane and said azeotrope-like compositions boil at about 30.8° C. at 760 mm Hg.

6. The azeotrope-like compositions of claim 5 comprising from about 64.5 to about 89.5 weight percent said 1,1-dichloro-1-fluoroethane, from about 10 to about 35 weight percent said 1,2-dichloro-1,1,2-trifluoroethane, and from about 0.5 to about 25.5 weight percent said n-pentane.

7. Azeotrope-like compositions consisting essentially of from about 55 to about 94.5 weight percent 1,1-dichloro-1-fluoroethane, from about 5 to about 44.5 weight percent of a mixture of 1,1-dichloro-2,2,2-trifluoroethane and 1,2-dichloro-1,1,2-trifluoroethane, and from about 0.5 to 45 weight percent n-pentane wherein said azeotrope-like components consist of said 1,1-dichloro-1-fluoroethane, said mixture of 1,1-dichloro-2,2,2-trifluoroethane and 1,2-dichloro-1,1,2-trifluoroethane, and said n-pentane and said azeotrope-like compositions boil at about 30.8° C. at 760 mm Hg.

8. The azeotrope-like compositions of claim 7 comprising from about 64.5 to about 89.5 weight percent said 1,1-dichloro-1-fluoroethane, from about 10 to about 35 weight percent said mixture, and from about 0.5 to about 25.5 weight percent said n-pentane.

9. The azeotrope-like compositions of claim 1 wherein said dichlorotrifluoroethane is 1,1-dichloro-2,2,2-trifluoroethane, said alkane is cyclopentane, and said azeotrope-like compositions boil at about 31.9° C at 760 mm Hg.

10. Azeotrope-like compositions consisting essentially of from about 55 to about 94.5 weight percent 1,1-dichloro-1-fluoroethane, from about 5 to about 44.5 weight percent 1,1-dichloro-2,2,2-trifluoroethane, and from about 0.5 to about 45 weight percent cyclopentane wherein said azeotrope-like components consist of said 1,1-dichloro-1-fluoroethane, said 1,1-dichloro-2,2,2-trifluoroethane, and said cyclopentane and said azeotrope-like compositions boil at about 31.9° C. at 760 mm Hg.

11. The azeotrope-like compositions of claim 10 comprising from about 64.5 to about 89.5 weight percent said 1,1-dichloro-1-fluoroethane, from about 10 to about 35 weight percent said 1,1dichloro-2,2,2-trifluoroethane, and from about 0.5 to about 25.5 weight percent said cyclopentane.

12. Azeotrope-like compositions consisting essentially of from about 55 to about 94.5 weight percent 1,1-dichloro-1-fluoroethane, from about 5 to about 44.5 weight percent 1,2-dichloro-1,1,2-trifluoroethane, and from about 0.5 to about 45 weight percent cyclopentane wherein said azeotrope-like components consist of said 1,1-dichloro-1-fluoroethane, said 1,2-dichloro-1,1,2-trifluoroethane, and said cyclopentane and said azeotrope-like compositions boil at about 31.9° C. at 760 mm Hg.

13. The azeotrope-like compositions of claim 12 comprising from about 64.5 to about 89.5 weight percent said 1,1-dichloro-1-fluoroethane, from about 10 to about 35 weight percent said 1,2dichloro-1,1,2-trifluoroethane, and from about 0.5 to about 25.5 weight percent said cyclopentane.

14. Azeotrope-like compositions consisting essentially of from about 55 to about 94.5 weight percent 1,1-dichloro-1-fluoroethane, from about 5 to about 44.5 weight percent of a mixture of 1,1-dichloro-2,2,2-trifluoroethane and 1,2-dichloro-1,1,2-trifluoroethane, and from about 0.5 to about 45 weight percent cyclopentane wherein said azeotrope-like components consist of said 1,1-dichloro-1-fluoroethane, said mixture of 1,1-dichloro-2,2,2-trifluoroethane and 1,2-dichloro-1,1,2-trifluoroethane, and said cyclopentane and said azeotrope-like compositions boil at about 31.9° C. at 760 mm Hg.

15. The azeotrope-like compositions of claim 14 comprising from about 64.5 to about 89.5 weight percent said 1,1-dichloro-1-fluoroethane, from about 10 to about weight percent said mixture, and from about 0.5 to about 25.5 weight percent said cyclopentane.

16. A method of cleaning a solid surface which comprises treating said surface with said azeotrope-like composition as defined in claim 3.

17. A method of cleaning a solid surface which comprises treating said surface with said azeotrope-like composition as defined in claim 5.

18. A method of cleaning a solid surface which comprises treating said surface with said azeotrope-like composition as defined in claim 10.

19. A method of cleaning a solid surface which comprises treating said surface with said azeotrope-like composition as defined in claim 12.

* * * * *

UNITED STATES PATENT AND TRADEMARK OFFICE
CERTIFICATE OF CORRECTION

PATENT NO. : 5,026,502
DATED : June 25, 1991
INVENTOR(S) : Peter Logsdon et al.

It is certified that error appears in the above-identified patent and that said Letters Patent is hereby corrected as shown below:

Col. 16, line 45-46, "about weight percent" should read -- about 35 weight percent --.

Signed and Sealed this

Twenty-fifth Day of May, 1993

Attest:

MICHAEL K. KIRK

Attesting Officer

Acting Commissioner of Patents and Trademarks